(No Model.)
W. F. FARRELL.
CULTIVATOR ATTACHMENT.
No. 550,713. Patented Dec. 3, 1895.
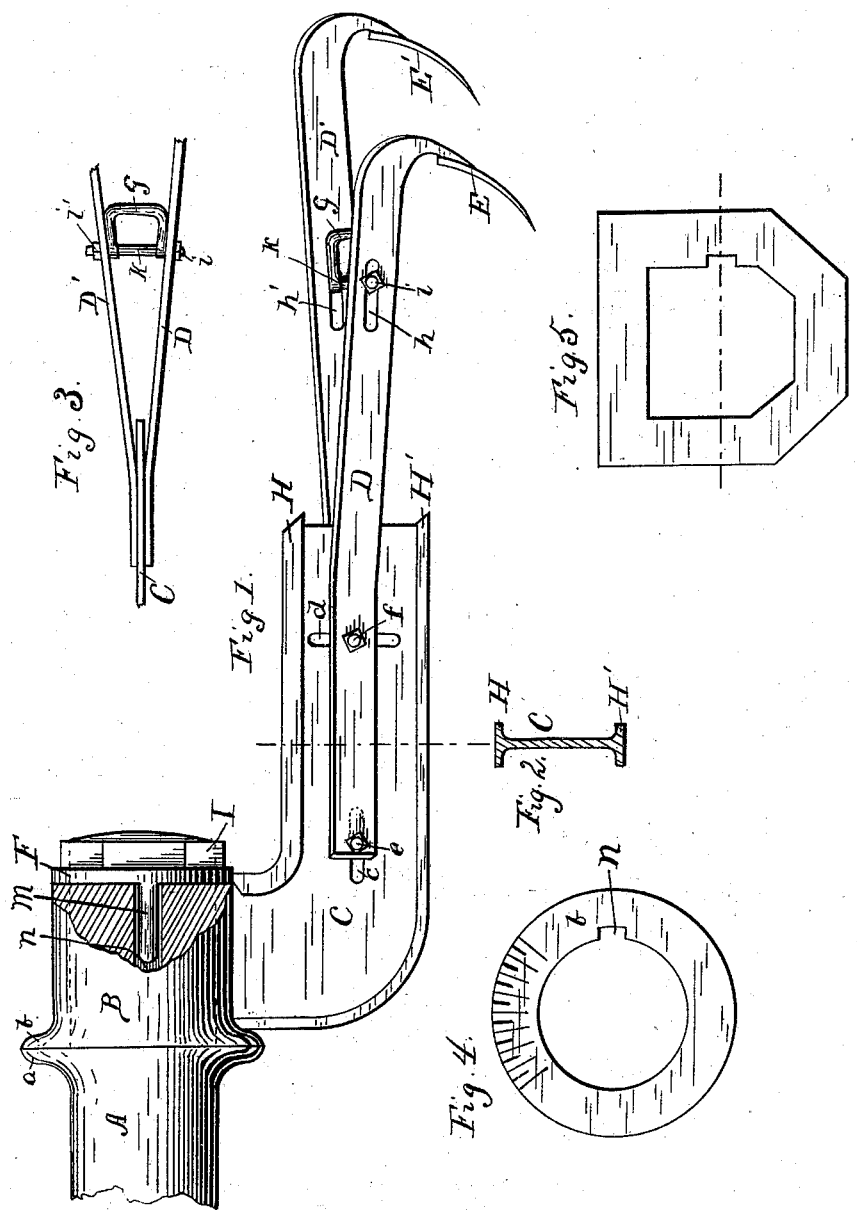
Witnesses
H. I. Curry
W. F. Wolfe
Inventor
Wm. F. Farrell
By
W. W. Curry
Atty.

UNITED STATES PATENT OFFICE.

WILLIAM F. FARRELL, OF AFTON, KANSAS.

CULTIVATOR ATTACHMENT.

SPECIFICATION forming part of Letters Patent No. 550,713, dated December 3, 1895.

Application filed August 19, 1895. Serial No. 559,856. (No model.)

*To all whom it may concern:*

Be it known that I, WILLIAM F. FARRELL, a citizen of the United States, residing at Afton, in the county of Marshall and State of Kansas, have invented certain new and useful Improvements in Cultivator Attachments, of which the following is a specification, reference being had therein to the accompanying drawings.

My invention relates to improvements in cultivators, more particularly the class of ridging cultivators which carry extending backward a beam or beams upon the end of which are fastened disk-blades or other cultivating apparatus.

It consists of an attachment constructed of any suitable metal, which, carrying shovels or other alternate cultivating-shares, is connected with the beam end when the disks are removed, so that the same cultivator can be used as a disk or a shovel cultivator, as may be desired. The advantage is that it makes two machines out of one, thus effecting a large saving of cost to those who use them.

In the accompanying drawings, which are a part of this specification, the same letters refer to the same parts in all the figures.

Figure 1 is a perspective view of the attachment with portions broken away, showing its parts and mode of connection with the beam. Fig. 2 is a section of the coupling-arm. Fig. 3 is a plan showing the brace and bolt between the shovel-arms. Fig. 4 shows the serrated face of the flange of the sleeve which joins the flange or collar of the beam and the channel for the tongue of washer. Fig. 5, divided into upper and lower halves, shows an alternative sleeve with a square and an octagon opening to fit upon a beam or socket when constructed of such shape.

In the drawings, A is the beam of the cultivator, to which the disks or cultivating-shares are attached and from which they are detached in order to apply my apparatus.

C is my coupling-arm, which is curved to a right angle and the one end firmly fastened to a tube or sleeve B. This sleeve is sized and shaped to fit upon the socket end of the beam, from which the disk-arm is removed without change of the beam.

*a* and *b* are the flanges or collars, respectively, of the beam and the sleeve as joined.

I is the nut which holds the sleeve upon the socket.

F is a washer between the nut and sleeve, having a wedge-shaped tongue *m* at one edge at right angles to its surface, and engaging a channel *n* in the sleeve to prevent slipping or turning. The face surface of the flange *b* is serrated, as shown in Fig. 4, around a part or the whole of its circumference as a further security against turning.

H H' are the edges of the coupling-arm at right angles to the body, constituting it I-shaped, securing the greatest stiffness combined with lightness, as shown in Fig. 2.

D D' are arms carrying shovels E E' in the usual form and manner. These shovel-arms are connected with the coupling-arms at *e* by a bolt and nut. This bolt is in a slotted opening *c*, to allow sufficient play for a horizontal adjustment. The arms are also connected in like manner at *f*, to allow a perpendicular adjustment in the slot *d*. The shovel-arms are also adjustably connected by means of a brace G and bolt *k* and nuts *i i'* in slots *h h'* in the arms.

The shovels and adjustable brace are not claimed as new devices, but only as parts of the combination.

From this description of my invention and its several parts its use and operation are obvious.

Taking any cultivator which presents the end of a beam with a socket on which is fastened detachable cutting or plowing devices—say the Janesville, Wisconsin, disk cultivator—this attachment is removed and my attachment is substituted. This is done as readily as one wheel is substituted for another.

I do not confine my claim to any particular cultivator nor to a tubular sleeve, since it is obvious that this sleeve can be made square or of any other required form to fit a different beam-socket, as shown in Fig. 5, without affecting the coupling-arm or substance of my invention.

Having thus described my attachment and its use, what I claim as my invention, and desire to secure by Letters Patent, is—

1. In combination with a cultivator frame having a beam-end fitted for carrying a removable cultivating apparatus,—of a curved coupling-arm firmly united to a sleeve fitting upon such beam-end and carrying an alternative cultivating apparatus, as and for the purpose described and shown.

2. In combination with a cultivator frame having a beam-end fitted for carrying a removable disk attachment,—of a curved coupling-arm firmly united to a sleeve fitting upon such beam-end, and carrying shovels instead of disks, as and for the purpose described and shown.

3. In combination with a cultivator frame having a beam-end fitted for carrying a removable cultivating attachment,—of a curved coupling-arm having a sleeve fitting upon such beam-end, and carrying an alternative cultivating apparatus, adjustably attached to the coupling-arm by means of bolts in the slotted openings $c$ and $d$, as and for the purpose described and shown.

4. In combination with a cultivator frame having a beam-end fitted for carrying a removable cultivating attachment,—of a curved coupling-arm united to a sleeve fitting upon said beam-end and carrying an alternative cultivating apparatus, adjustably attached to the coupling-arm by means of bolts in the slotted openings $c$ and $d$, and having a washer with a wedge-shaped tongue to engage the sleeve, as and for the purpose shown and described.

5. In combination with a cultivator frame having a beam-end fitted for carrying a removable cultivating attachment,—of a curved coupling-arm united to a sleeve fitting upon the beam-end and carrying an alternate shovel apparatus, adjustably attached to the coupling-arm by means of bolts in the slotted openings $c$ and $d$, having a washer between the sleeve and nut with a wedge-shaped tongue, and having a brace and bolt between the shovel-arms, adjustable by means of slotted openings, as and for the purposes shown and described.

In testimony whereof I affix my signature in presence of two witnesses.

WILLIAM F. FARRELL.

Witnesses:
   THEO. H. POLACK,
   WILLIAM S. GLASS.